(12) United States Patent
Lin

(10) Patent No.: US 11,522,228 B2
(45) Date of Patent: Dec. 6, 2022

(54) BIPOLAR LEAD ACID STORAGE BATTERY

(71) Applicants: Zijin Lin, Taizhou (CN); Shuangying Chen, Taizhou (CN); Huanping Chen, Taizhou (CN)

(72) Inventor: Zijin Lin, Taizhou (CN)

(73) Assignees: Shuangying Chen, Taizhou (CN); Huanping Chen, Taizhou (CN)

(*) Notice: Subject to any disclaimer, the term of this patent is extended or adjusted under 35 U.S.C. 154(b) by 93 days.

(21) Appl. No.: 16/963,341

(22) PCT Filed: Dec. 20, 2018

(86) PCT No.: PCT/CN2018/122326
§ 371 (c)(1),
(2) Date: Jul. 20, 2020

(87) PCT Pub. No.: WO2019/148990
PCT Pub. Date: Aug. 8, 2019

(65) Prior Publication Data
US 2021/0066759 A1 Mar. 4, 2021

(30) Foreign Application Priority Data
Jan. 31, 2018 (CN) .......................... 201810095761.8

(51) Int. Cl.
*H01M 10/18* (2006.01)
*H01M 50/572* (2021.01)
(Continued)

(52) U.S. Cl.
CPC ......... *H01M 10/18* (2013.01); *H01M 50/317* (2021.01); *H01M 50/367* (2021.01);
(Continued)

(58) Field of Classification Search
CPC .... H01M 50/10; H01M 50/20; H01M 50/572; H01M 50/317; H01M 10/18
See application file for complete search history.

(56) References Cited

U.S. PATENT DOCUMENTS 2,161,383 A * 6/1939 Reinhardt ............ H01M 50/411
429/254
3,846,175 A * 11/1974 Desai .................. H01M 10/342
429/54
(Continued)

FOREIGN PATENT DOCUMENTS

CN           1220289 C     7/2004
CN    2009-238631     10/2009
(Continued)

OTHER PUBLICATIONS

Machine Translation of: CN 106876804A, Zijin, Jun. 20, 2017.*
(Continued)

*Primary Examiner* — Kenneth J Douyette
(74) *Attorney, Agent, or Firm* — Olive Law Group, PLLC

(57) ABSTRACT

Provided is a bipolar lead-acid battery relating to the technical filed of battery. The bipolar lead-acid battery includes a housing with a battery cavity inside and a plurality of single cells provided in the battery cavity, each of the single cells has an inner cavity for electrolyte injection, and the inner cavity of each single cell is independent of one another, and the housing has a plurality of air-distributing chambers communicating with the inner cavity of the each of the single cells in one-to-one correspondence above the battery cavity, wherein the housing further has a common pressure chamber, the air-distributing chambers communicate with the common pressure chamber through vents, respectively. The bipolar lead-acid battery has the advantages that it can be successfully manufactured and can be
(Continued)

used normally, and solves the problems of short service life and unsuccessful manufacture of the existing battery.

19 Claims, 20 Drawing Sheets

(51) Int. Cl.
*H01M 50/317* (2021.01)
*H01M 50/609* (2021.01)
*H01M 50/367* (2021.01)
*H01M 50/618* (2021.01)

(52) U.S. Cl.
CPC ....... *H01M 50/572* (2021.01); *H01M 50/609* (2021.01); *H01M 50/618* (2021.01)

(56) References Cited

U.S. PATENT DOCUMENTS

| | | | | |
|---|---|---|---|---|
| 4,264,691 A | * | 4/1981 | O'Rell | H01M 50/411 |
| | | | | 429/250 |
| 4,444,853 A | * | 4/1984 | Halsall | H01M 50/147 |
| | | | | 429/54 |
| 5,631,100 A | * | 5/1997 | Yoshino | H01M 4/525 |
| | | | | 429/62 |
| 2010/0062335 A1 | | 3/2010 | Datta | |
| 2013/0221931 A1 | | 8/2013 | Aanensen et al. | |
| 2014/0141292 A1 | * | 5/2014 | Lee | H01M 50/308 |
| | | | | 429/54 |

FOREIGN PATENT DOCUMENTS

| | | |
|---|---|---|
| CN | 205985237 A | 2/2017 |
| CN | 106876804 A | 6/2017 |
| CN | 201710179695.8 A | 6/2017 |
| CN | 206541898 A | 10/2017 |
| CN | 206542226 A | 10/2017 |
| CN | 108198964 A | 6/2018 |
| CN | 207800654 A | 8/2018 |

OTHER PUBLICATIONS

Machine Translation of: CN 206542226U, Yijun et al., Oct. 3, 2017.*
Written Opinion for related PCT International Application No. PCT/CN2018/122326 dated Mar. 18, 2019.
International Search Report for related PCT International Application No. PCT/CN2018/122326.

* cited by examiner

BIPOLAR LEAD ACID STORAGE BATTERY

CROSS REFERENCE TO RELATED APPLICATION

This application is a 371 national stage patent application of PCT International Patent Application No. PCT/CN2018/122326, titled BIPOLAR LEAD ACID STORAGE BATTERY, and filed Dec. 20, 2018, which claims priority to Chinese Patent Application No. 201810095761.8, filed Jan. 31, 2018, the content of which is incorporated herein by reference in its entirety.

TECHNICAL FIELD

The disclosure belongs to the technical field of battery, relates to a bipolar lead-acid battery, and in particular to a bipolar lead-acid battery with an air-distributing chamber having common pressure inside.

BACKGROUND

The structure of the bipolar lead-acid battery includes a positive plate, a plurality of bipolar plates, a negative plate, a separator, an electrolyte, a battery tank, and a battery cover, etc. Among them, the bipolar plates are formed by the bipolar substrate with coating positive and negative pastes on both sides thereof respectively. Through the design of the bipolar plates, the lead paste utilization rate is improved and the specific energy of the battery can be high.

For example, the applicant has designed a bipolar lead-acid battery and filed a Chinese patent application (the application No. is 201710179695.8 and the Publication No. is CN106876804A). The bipolar lead-acid battery includes a housing with an upper opening and a top cover connected to the upper of the housing, and the top cover has a cavity. The housing is provided with bipolar plates parallel arranged, and the internal cavity of the housing is divided into a number of flat rectangular compartments by the bipolar plates; a flat battery cell is provided in the compartment and the upper opening of the housing is provided with a cover plate, the lower side of the cover plate is sealingly connected to the bipolar plate and the upper side of the cover plate is sealingly connected to the top cover. The cavity of the top cover is divided into air chambers that are equal as the compartments in quantity and that are independent of each other. Several air chambers correspond to several compartments one by one and communicate with each other through a through hole formed in the cover plate. Each of the air chambers is connected with a one-way valve. The lead-acid battery connects each compartment to an independent air chamber, so that each compartment has an independent exhaust path to avoid micro-short circuit and self-discharge caused by electrolyte channeling, which can ensure the normal use of the battery and improve the performance of the battery.

However, in the above bipolar lead-acid battery, the battery cells in each compartment are exhausted through an air chamber and a one-way valve connected to the air chamber, that is, the battery cells in each compartment are completely separated, such that the internal cavity of each battery cell is filled with electrolyte and is prone to inconsistent internal pressure after charging. The inconsistent internal pressure will destroy the battery structure and cause the performance of the battery to decline, which ultimately affects the service life.

To this end, those skilled in the art have also designed a bipolar battery that automatically balances the internal pressure of the single cells and shares the safety valve (the application No. is 03133542.X; the Publication No. is CN1220289C). The bipolar battery consists of a middle single cell, a side single cell, a safety valve, a diaphragm and other structures. The middle single cell is composed of frame, bipolar substrate, positive plate and negative plate. The bipolar substrate is fixed in the frame and the positive plate is fixed on one side of the bipolar substrate, the negative plate is fixed on the other side of the bipolar substrate. A through hole is provided in the upper part of the bipolar substrate, and the through hole connects all the inner cavities of the middle single cell and the side single cells. And the through holes are set on the pressure plate outside the side single cells and safety valves are provided, so that the inner cavities of the all single cells in the battery are connected to the safety valves on the side of the battery through several through holes to share one safety valve, making the internal pressure of each of the single cells inside the battery consistent and ensuring the service life of the battery.

However, during the inner formation process of the battery, the assembled battery needs to be filled with electrolyte and charged. The internal chambers of the individual single cells in the above-mentioned bipolar battery are completely connected through the through holes, and then when performing the inner formation, it is easy to cause an internal short circuit and seriously affect the inner formation of the battery, which eventually leads to the failure of the battery manufacture.

SUMMARY

The purpose of the present disclosure is to provide a bipolar lead-acid battery in view of the prior art. The technical problem to be solved is how to increase the service life of the lead-acid battery under the premise that the lead-acid battery can be successfully manufactured.

The object of the present disclosure can be achieved by the following technical solutions:

Provided is a bipolar lead-acid battery including a housing with a battery cavity inside and a plurality of single cells provided in the battery cavity, each of the single cells may have an inner cavity into which electrolyte can be injected, and inner cavities of the single cells are independent of each other. The housing may further have a plurality of air-distributing chambers that are in one-by-one correspondence with the inner cavities of the single cells, the plurality of air-distributing chambers are provided above the battery cavity, wherein the housing may also have a common pressure chamber. All the air-distributing chambers communicate with the common pressure chamber through vents, respectively.

In the bipolar lead-acid battery, the inner cavity of each single cell can communicate with the same common pressure chamber through the air-distributing chamber and the vent in sequence, that is, the inner cavities of several single cells are connected to avoid the damage of the internal structure of the battery due to the inconsistent internal pressures of the individual cells, which ensure the normal use of the battery. At the same time, the inner cavities of the individual cells in the bipolar lead-acid battery are independent of each other. During the inner formation process, filling the inner cavities of the individual cells with electrolyte can also prevent the electrolyte channeling of the individual cells one another that can result in a short circuit.

Even during the charging process, the electrolyte will rise upward due to the expansion and contraction of the electrode plate, the electrolyte in each single cell is still divided in each air-distributing chamber and the short circuit will not occur, which ensures the normal use of the battery and prolongs the service life of the battery. That is, the bipolar lead-acid battery achieves the technical purpose of the common pressure of the air-distributing chamber.

In the above-mentioned bipolar lead-acid battery, the common pressure chamber may be located above the air-distributing chambers, and the vents are respectively connected to the bottom of the common pressure chamber. The gas generated in the single cell is naturally ascending, and the common pressure chamber is arranged above each air-distributing chamber, which can ensure that the gas is smoothly delivered to the common pressure chamber to achieve the common pressure of each single cell, avoiding the situation that the internal structure of the battery is destroyed due to the inconsistency of the internal pressure of the single cell, and ensuring the normal use of the battery.

In the above-mentioned bipolar lead-acid battery, the vents of the air-distributing chamber are all connected with air hole umbrella caps made of an insulating material. Since the battery will self-discharge when it is not in use, the arrangement of the air hole umbrella caps can insulate the individual single cells when the battery is not in use, to avoid the mutual effects occurrence of self-discharge between adjacent cells leading to a current increase in self-discharge, and the air hole umbrella cap is used to make the insulation performance better among the single cells, to avoid the single cell being connected to the common pressure chamber to cause excessive self-discharge current among the single cells, which ensures the service life of the battery.

In the above-mentioned bipolar lead-acid battery, the air hole umbrella cap may include a connecting portion with a cylindrical shape, an upper end of the connecting portion is folded outward to form a ring-shaped umbrella portion, the housing is located at an upper end of the vent and has a cylindrical exhaust portion protruding upward, and the connecting portion is inserted or sleeved on the exhaust portion.

The inner cavity, air-distributing chamber and common pressure chamber of the single cell are in a communicated state. After the electrolyte in the single cell vaporizes into the common pressure chamber, small water droplets formed by cold will drip on the outer surface of the air hole umbrella cap and the bottom surface of the common pressure chamber, so the self-discharge current will be too large among the individual cells. The upper end of the air hole umbrella cap can be folded to form an annular umbrella portion, that is, there is a concave annular groove between the umbrella portion and the connecting portion, the small water droplets on the outer surface of the air hole umbrella cap and the small water droplets in the bottom of the common pressure chamber are blocked by the concave annular groove, and the air hole umbrella cap itself is made of insulating material, so the ring-shaped umbrella portion can well achieve the electrical shielding between two adjacent vents, avoiding the battery self-discharge phenomenon, and does not affect the normal exhaust at the vents.

At the upper end of the vent, there is a cylindrical exhaust portion protruding upward, which extends into the common pressure chamber and is higher than the bottom surface of the common pressure chamber, to further prevent the electrolyte from pouring into the common pressure chamber and avoid the electrolyte channeling of the single cells one another and a short circuit as well.

In the above-mentioned bipolar lead-acid battery, the single cell may include a ring-shaped sealing rubber ring, and a positive plate, a separator and a negative plate sequentially arranged, and the positive plate and the negative plate may be provided with substrates at one side opposite to the separator, the sealing rubber ring may be connected between the outer edges of the two substrates and sealing is formed among the two substrates and the sealing rubber ring. The inner cavity of the single cell may be located in the sealing rubber ring, and the sealing rubber ring is provided with a plurality of through holes for communicating the inner cavity with the air-distributing chamber. The setting can ensure that the individual cells are independent of each other, and can better avoid short circuits during formation.

In the above-mentioned bipolar lead-acid battery, the single cell may further include a diaphragm made of an insulating material disposed between the two substrates. Providing the diaphragm made of insulating material in each single cell can effectively prevent the micro-short circuit phenomenon that occurs during the charging and discharging of the battery, and can ensure the service life of the battery.

In the above-mentioned bipolar lead-acid battery, the diaphragm may be of a square ring shape, the substrates and the separator may be of square shape. The diaphragm has an outside length not less than the length of the substrates, the diaphragm has an outside width not less than the width of the substrates, the diaphragm has an inside length less than the length of the separator, the diaphragm has an inside width less than the width of the separator. The four peripheral edges of the substrates can protrude from the electrodes, and a diaphragm is provided between the outer edges of the substrates to avoid the electronic exchange between the edges of the substrates during the charging and discharging process, resulting in short circuits between the electrodes in the middle of the substrates. The inside length and inside width of the diaphragm are smaller than the length and width of the separator, so that each single cell will undergo ion exchange through the separator during the reaction process.

In the above-mentioned bipolar lead-acid battery, the diaphragm may have a plurality of ribs in the middle. The arrangement of the ribs can ensure that the diaphragm itself is not easily deformed.

In the above-mentioned bipolar lead-acid battery, the housing may include a battery case, an air chamber cover, an air chamber middle cover, and a common pressure chamber cover that are connected from bottom to top. The battery chamber may be located in the battery case, the plurality of air-distributing chambers may be formed between the air chamber cover and the air chamber middle cover. The common pressure chamber may be formed between the air chamber middle cover and the common pressure chamber cover. The upper part of the housing is divided into a three-layer structure, so that when the battery is produced, the air chamber cover and the air chamber middle cover are first assembled, electrolyte are filled, and entered into the battery formation. After the formation is completed, the acid is pumped and the air hole umbrella cap is added. Then the common pressure chamber cover and the safety valve that can connect the common pressure chamber to the outside of the housing are installed, and the battery is completed.

In the above-mentioned bipolar lead-acid battery, the air chamber cover may include a bottom plate and a plurality of partition plates fixed vertically on the upper side of the bottom plate. The partition plates may be alternately arranged, and the above air-distributing chambers may be separated between the partition plates. The lower side of the air chamber middle cover can abut against the upper ends of the partition plates and a seal can be formed. The vent may be provided on the air chamber middle cover. Several air-distributing chambers are separated by a vertically established separator, so that each air-distributing chamber may have a corresponding single cell.

Compared with the prior art, the bipolar lead-acid battery may have the following advantages:

1. Through the setting of the common pressure chamber, the internal pressure of the single cells in the battery is consistent, which ensures the structure and reaction balance between the single cells in the battery, and ensures the normal use of the battery.

2. The setting of the diaphragm can effectively prevent the electrolyte from being transferred through the separator during ion exchange between the positive and negative plates in the single cell, resulting in a micro-short circuit of the battery, which further ensures the successful production and normal use of the battery.

3. Each single cell is sealed to form a separate whole by a ring-shaped sealing rubber ring, which can not only ensure the independence between each single cell, but also facilitate the installation of the housing.

4. The air hole umbrella cap made of insulating material is placed at the connection between the air-distributing chamber and the common pressure chamber, which can effectively avoid the self-discharge phenomenon of the battery.

In the figures:
1. housing; 11, battery case; 11a, battery cavity; 12, air chamber cover; 12a, air-distributing chamber, 12b, bottom plate; 12c, partition plate; 12d, plug hole; 13, air chamber middle cover, 13a, vent; 13b, exhaust portion; 13c, positioning groove; 14, common pressure chamber cover; 14a, common pressure chamber; 14b, exhaust port; 14c, fixed seat; 14d, connecting post; 14e, positioning surface;
2. single cell; 21, inner cavity; 22, positive plate; 23, separator, 24, negative plate; 25, bipolar substrate; 26, electrode substrate;
3. safety valve;
4. sealing rubber ring; 41, plug portion; 41a, through hole;
5. diaphragm; 51, rib; 52, fixing plate; 53, positioning plate; 53a, communicating hole; 54, connecting plate;
6. air hole umbrella cap; 61, connecting portion; 62, umbrella portion; 62a, umbrella edge; 63, annular groove; 63a, groove bottom; 64, V-shaped groove;
7. bonnet;
8. air valve cover; 81, air outlet.

DETAILED DESCRIPTION OF EMBODIMENTS

The following are the technical solutions of the present disclosure further described with reference to the specific embodiments and the accompanying drawings of the present disclosure, but the present disclosure is not limited to these embodiments.

Embodiment 1

Figure 1:
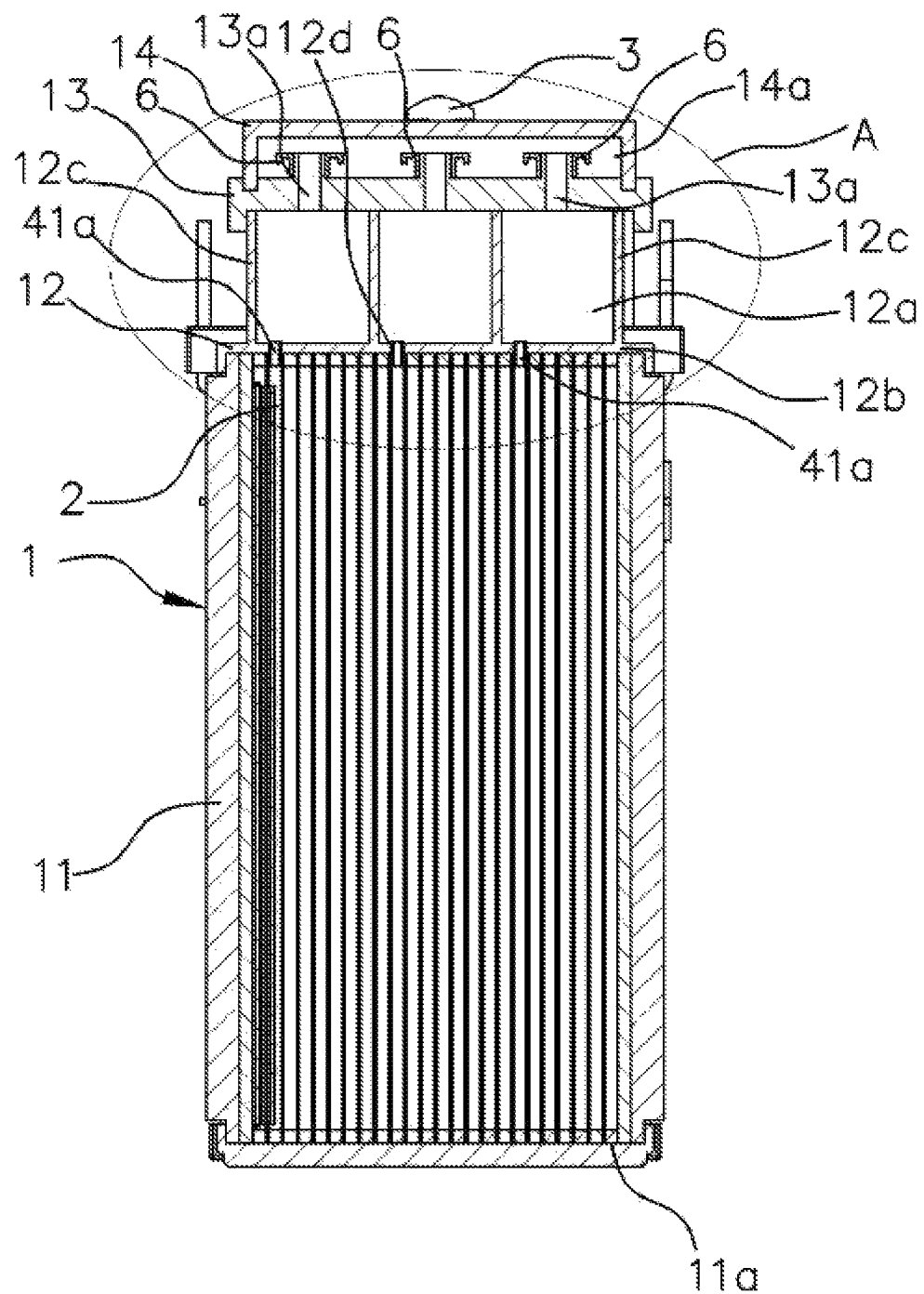
FIG. 1 is one embodiment of a schematic sectional view of the bipolar lead-acid battery of the present disclosure.
Figure 2:
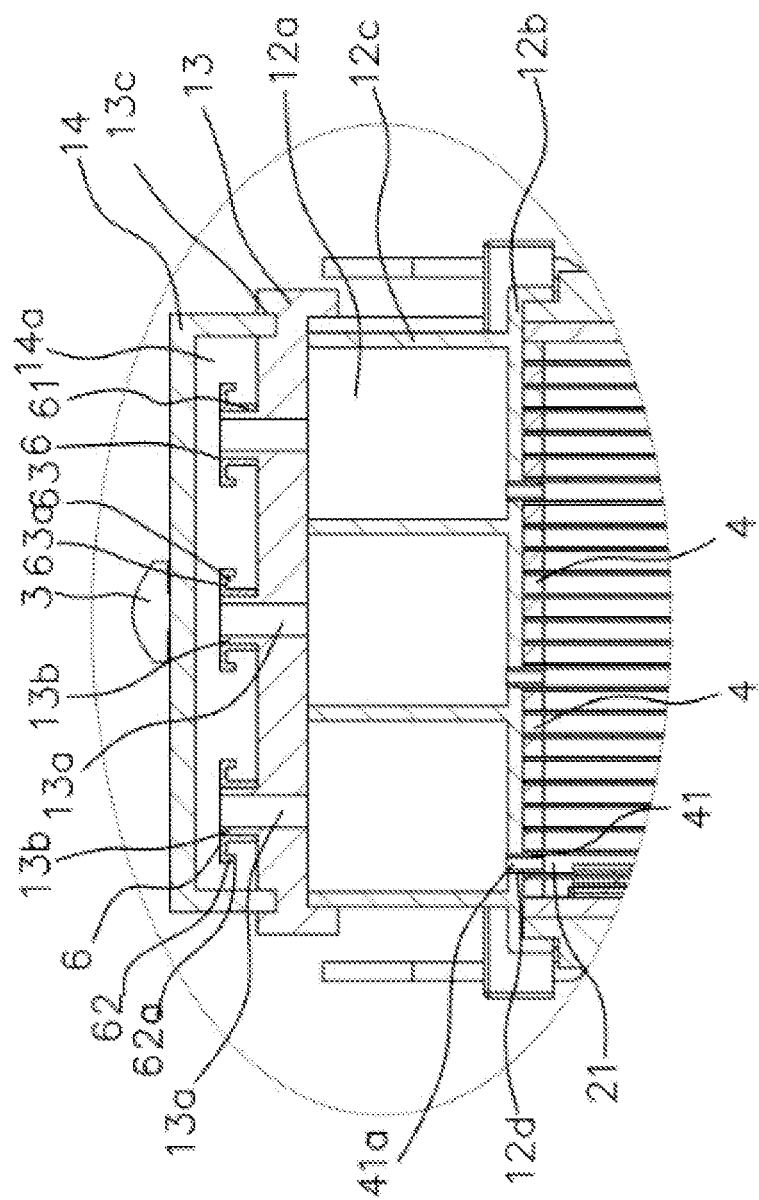
FIG. 2 is one embodiment of a partial enlarged view of portion A in FIG. 1 of the bipolar lead-acid battery of the present disclosure.

As shown in FIGS. 1 and 2, the bipolar lead-acid battery may include a housing 1 having a battery cavity 11a inside, a plurality of single cells 2 provided in the battery cavity 11a, and a safety valve 3 connected to the outside of the housing 1. Among them, the reaction processes of the plurality of single cells 2 in the battery cavity 11a are independent, and each single cell 2 may have an inner cavity 21 for electrolyte injection and the inner cavities 21 of several single cells 2 are independent of one another. The housing 1 may be also provided with a plurality of independent air-distributing chambers 12a above the battery chamber 11a. The quantities of the air-distributing chambers 12a and the single cells 2 are the same, and the plurality of air-distributing chambers 12a are in one-to-one correspondence with the inner cavities 21 of the plurality of single cells 2. The housing 1 may be also provided with a common pressure chamber 14a above the air-distributing chambers 12a. The plurality of air-distributing chambers 12a can communicate with the bottom of the common pressure chamber 14a through the vents 13a, respectively. The safety valve 3 can be connected to the exhaust port 14b of the common pressure chamber 14a.

Figure 3:
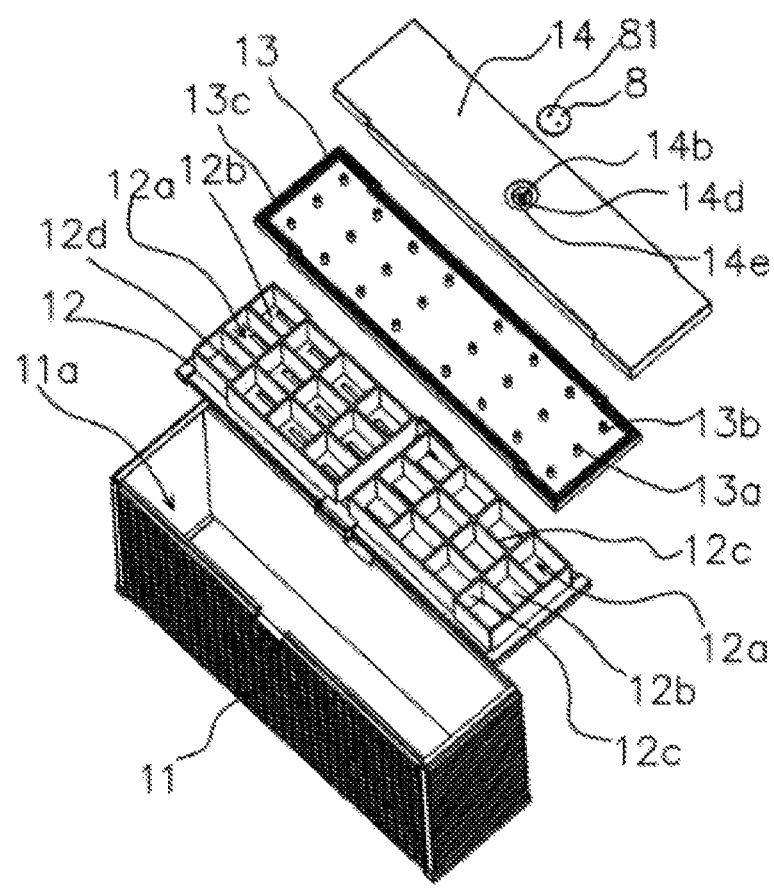
FIG. 3 is one embodiment of an exploded schematic view of the housing of the bipolar lead-acid battery of the present disclosure.

Specifically, as shown in FIGS. 1, 2, and 3, the housing 1 may include a battery case 11, an air chamber cover 12, an air chamber middle cover 13, and a common pressure chamber cover 14 that are connected in order from bottom to top. The upper side of the battery case 11 may be recessed to form the above-mentioned battery cavity 11a, and the air chamber cover 12 can be hermetically connected to the opening at the upper end of the battery case 11. Here, the battery case 11 may be formed by splicing several end plates.

Figure 4:
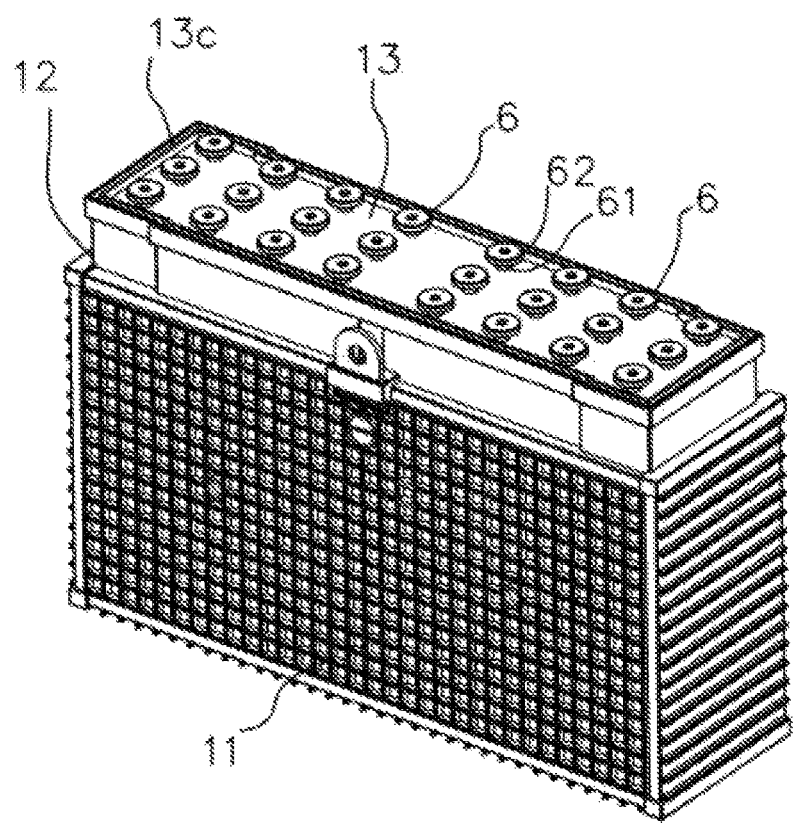
FIG. 4 is one embodiment of a schematic view of the structure of the bipolar lead-acid battery with the common pressure chamber cover open of the present disclosure.
Figure 5:
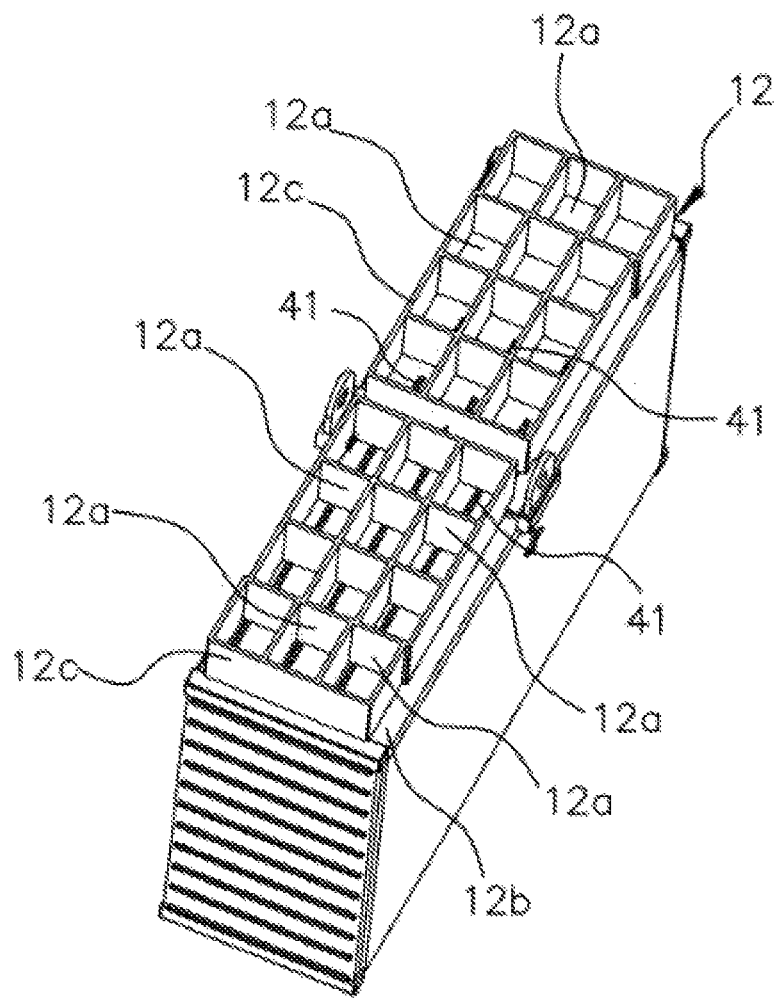
FIG. 5 is one embodiment of a schematic diagram of the structure of the bipolar lead-acid battery equipped with an air chamber cover of the present disclosure.

As shown in FIGS. 2 and 5, the air chamber cover 12 may include a bottom plate 12b and a plurality of partition plates 12c vertically fixed on the upper side of the bottom plate 12b, the plurality of partition plates 12c may be arranged alternately along the horizontal and vertical directions, and a plurality of air-distributing chambers 12a with the shape of a rectangular can be partitioned among the partition plates 12c. All of the air-distributing chambers 12a may be open on the upper side. As shown in FIGS. 2 and 4, the lower side of the air chamber middle cover 13 may abut the upper ends of the plurality of partition plates 12c and a seal may be formed, and the vents 13a of each of the air-distributing chambers 12a may penetrate through the air chamber middle cover 13. The vents 13a may be connected with a plurality of air hole umbrella caps 6 made of insulating acid-resistant material. As shown in FIG. 1, FIG. 2, FIG. 4 and FIG. 18, the air hole umbrella cap 6 may include a connecting portion 61 with a cylindrical shape, and an upper end of the connecting portion 61 may be folded outward to form an annular umbrella edge 62. A concave annular groove 63 may be formed between the umbrella edge 62 and the connecting portion 61, and the groove bottom 63a of the annular groove 63 may be a flat surface and can be located above the umbrella edge 62a. The housing 1 may be located at the upper end of the vent 13a and can have a cylindrical exhaust portion 13b protruding upward. The exhaust portion 13b may be integrated with the air chamber middle cover 13. The connecting portion 61 of the air hole umbrella cap 6 may be inserted or sleeved on the exhaust portion 13b, and the two can be fixed by means of glue or tight fit or the like. The upper surface of the air chamber middle cover 13 may be provided with a positioning groove 13c, and the lower end of the common pressure chamber cover 14 is inserted into the positioning groove 13c. The lower side of the common pressure chamber cover 14 may be inserted into the positioning groove 13c, and sealingly connected to the upper side of the air chamber middle cover 13 by sealant. The common pressure chamber 14a may be formed between the air chamber middle cover 13 and the common pressure chamber cover 14. The top of the common pressure chamber 14a, that is, the common pressure chamber cover 14 may be throughout provided with an exhaust port 14b. The safety valve 3 may be sealingly connected to the exhaust port 14b. The safety valve in this embodiment can be a conventional safety valve on the market.

As shown in FIGS. 5, 6, 7, 8, 9, and 10, the single cells 2 in the battery cavity 11a may be sequentially arranged in parallel, and each of the single cells may include a positive plate 22, a separator 23 and a negative plate 24, each of which is of square shape and stacked in sequence. The positive plate 22 and the negative plate 24 respectively may be provided with a substrate at the side opposite with respect to the separator 23. Here, the separator 23 may be an AGM separator paper, and two or more AGM separator papers may be provided between the positive plate 22 and the negative plate 24. In this embodiment, a diaphragm 5 made of an insulating and acid-resistant material may be further provided between the two substrates. The separators 23 are two pieces. The positive plate 22 and the negative plate 24 may be located outside the two pieces of separators 23 respectively. The diaphragm 5 may be provided between the two separators 23.

In this embodiment, the length and width of the substrate may be larger than the length and width of the positive plate 22 and the negative plate 24, and the edges around the substrate may extend beyond the outer edges of the positive plate 22 and the negative plate 24.

As shown in FIGS. 9, 10, 13, 14, and 15, the diaphragm 5 may have a square ring shape, and may include a fixing plate 52 and a positioning plate 53 arranged in parallel. The fixing plate 52 and the positioning plate 53 may be connected together by a connecting plate 54. The positioning plate 53 may be provided with a communicating hole 53a through which the electrolyte passes. The fixing plate 52 may be provided between the outer edges of the two substrates, and the positioning plate 53 may be provided between the two separators 23. The outer size of the diaphragm 5 may be equal to or larger than the outer size of the substrate, that is, the outer size of the fixing plate 52 is basically the same as that of the substrate. The diaphragm 5 may be provided between the outer edges of the substrates to avoid in the process of charging and discharging, the electronic exchange occurs between the edges of the substrate, causing the electrodes in the middle of the substrate to be short-circuited. The inner size of the diaphragm 5 may be smaller than that of the separator 23, that is, the inner size of the positioning plate 53 may be smaller than the outer size of the separator, so that each single cell 2 will undergo ion exchange through the separator 23 during the reaction.

Figure 7:
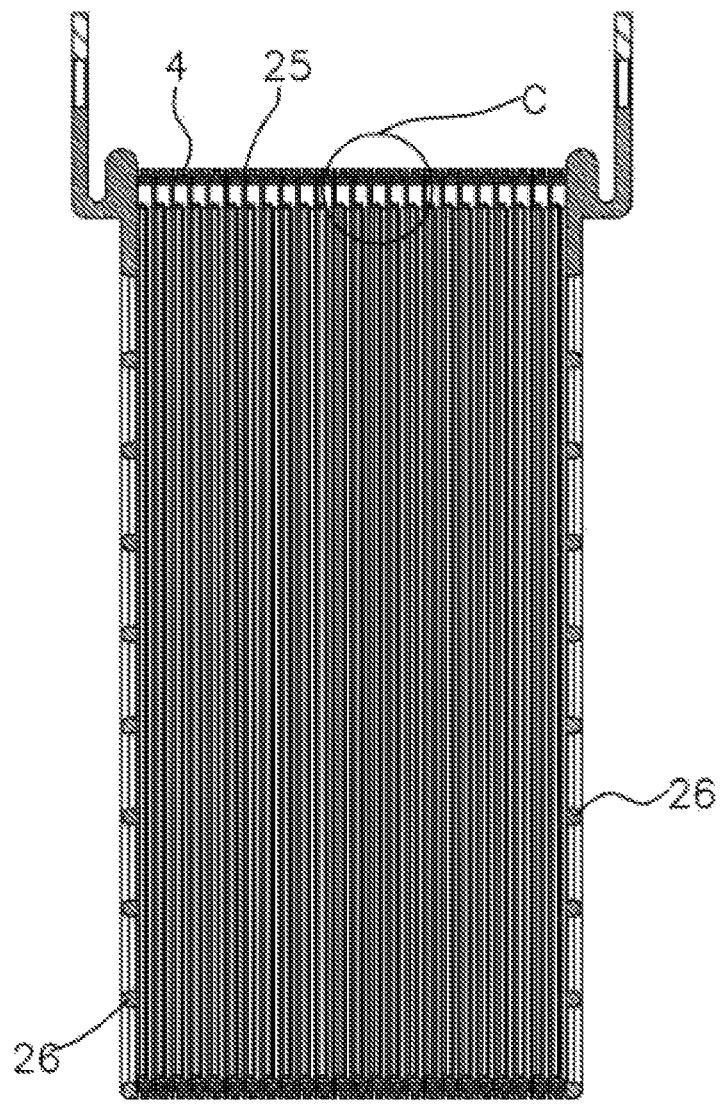
FIG. 7 is one embodiment of a schematic cross-sectional structure diagram of a plurality of single cells in this bipolar lead-acid battery after being sequentially stacked of the present disclosure.
Figure 8:
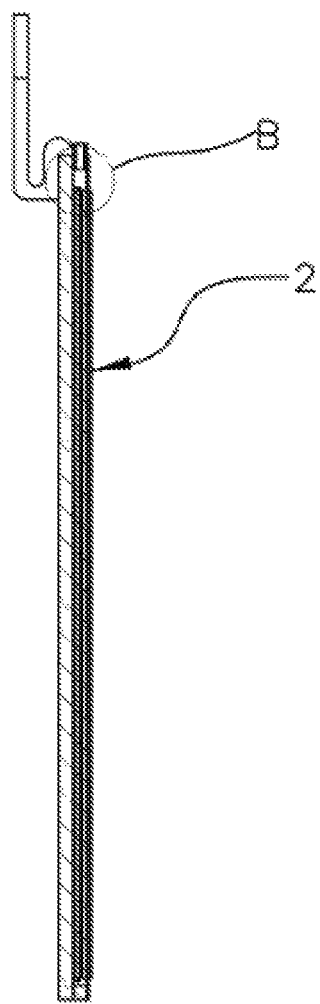
FIG. 8 is one embodiment of a schematic cross-sectional structural view of a plurality of single cells in the bipolar lead-acid battery of the present disclosure.
Figure 9:
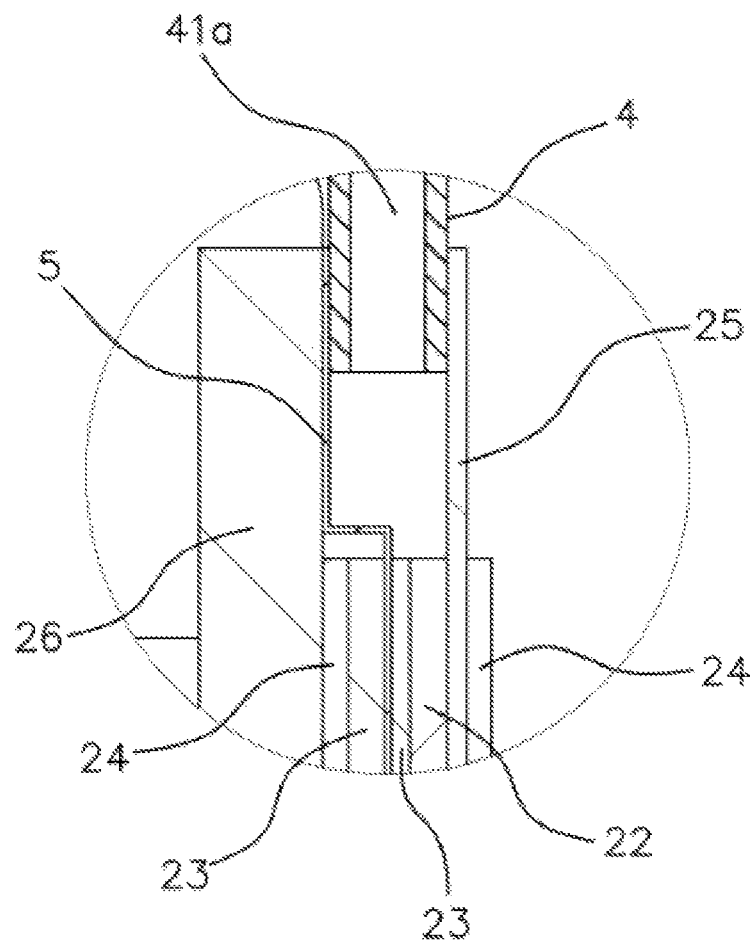
FIG. 9 is one embodiment of a partial enlarged view of portion B of FIG. 8 in the bipolar lead-acid battery of the present disclosure.
Figure 10:
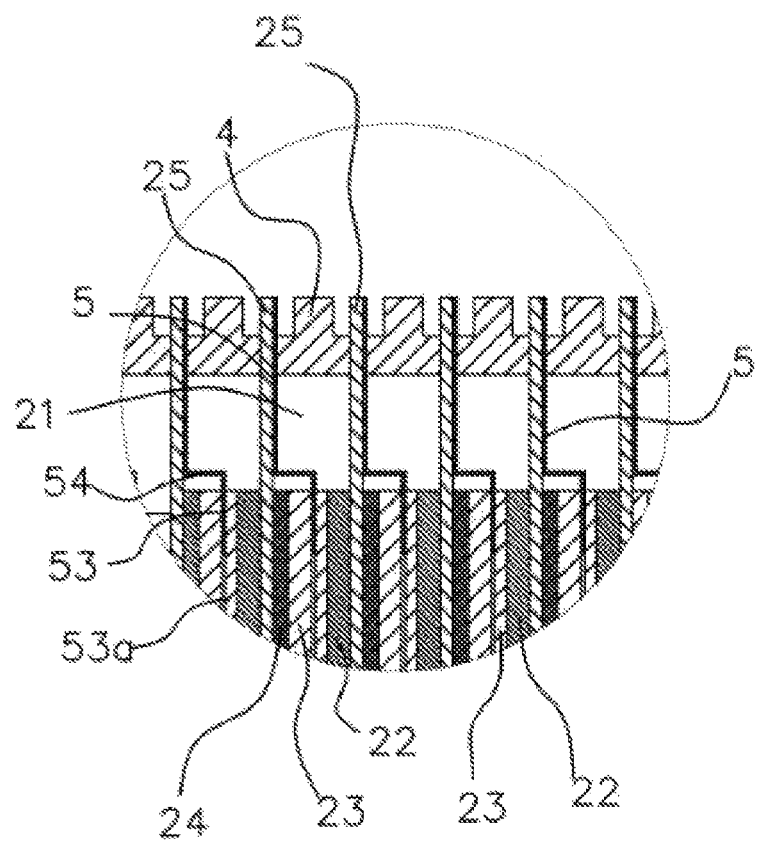
FIG. 10 is one embodiment of a partial enlarged view of the portion C of FIG. 7 in the bipolar lead-acid battery of the present disclosure.
Figure 11:
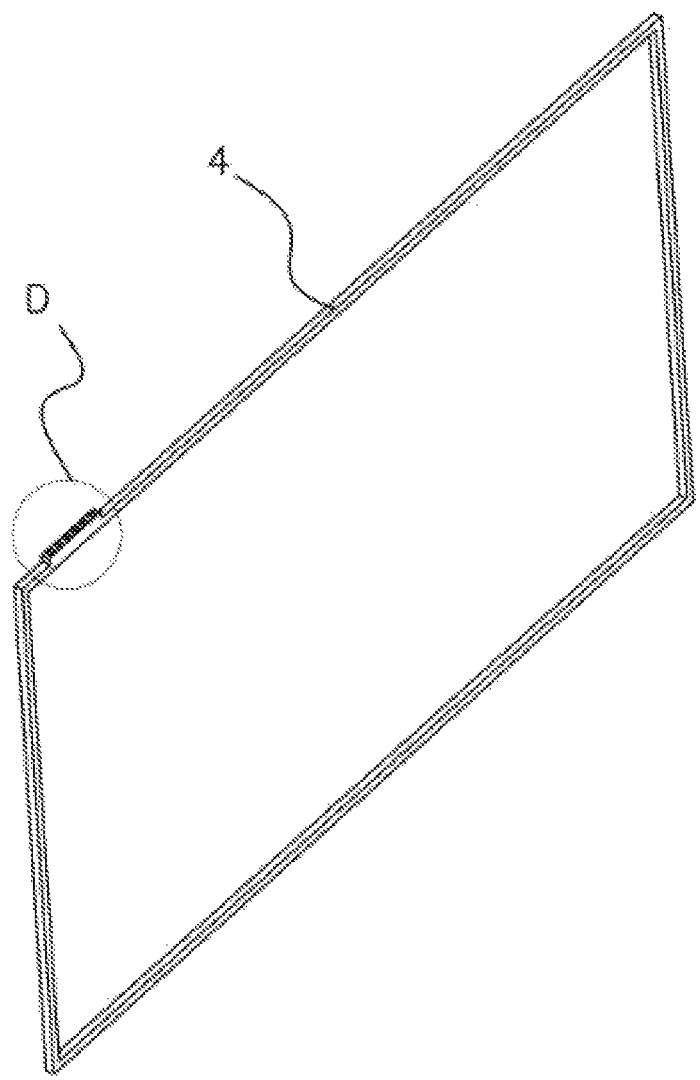
FIG. 11 is one embodiment of a schematic view of the structure of the sealing rubber ring in the bipolar lead-acid battery of the present disclosure.
Figure 12:
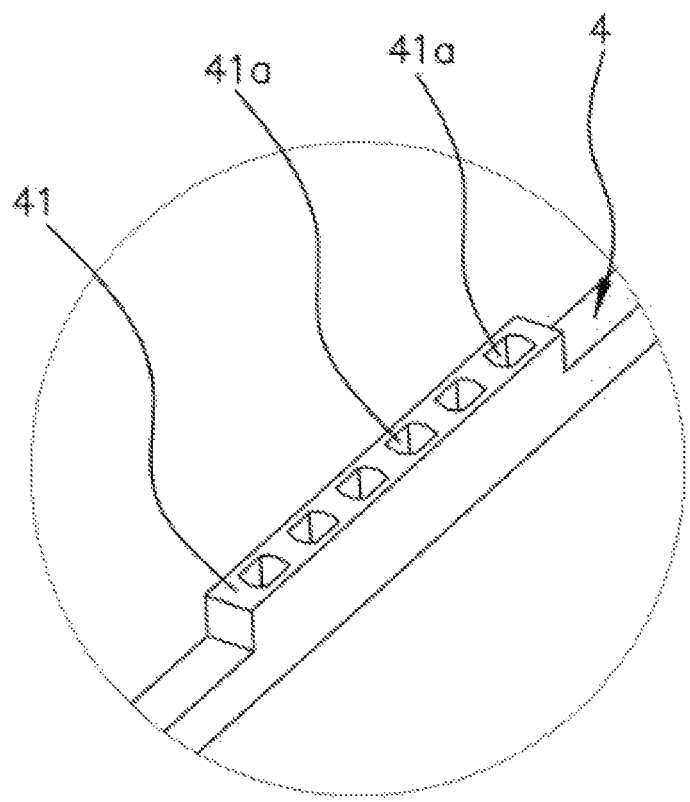
FIG. 12 is one embodiment of an enlarged view at portion D in FIG. 11 of the present bipolar lead-acid battery of the present disclosure.
Figure 13:
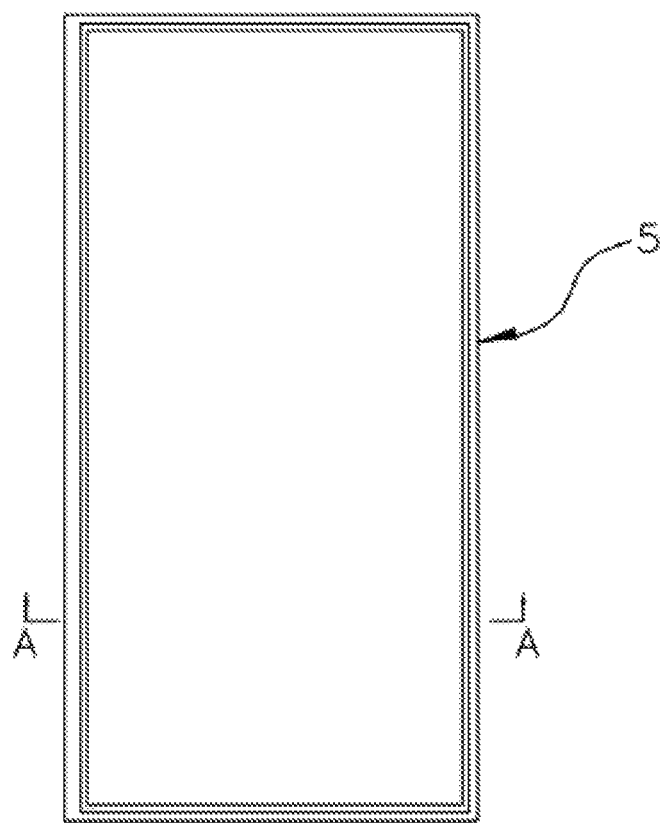
FIG. 13 is a schematic diagram of the structure of the diaphragm of Embodiment 1 of the bipolar lead-acid battery of the present disclosure.

Between the outer edges of the two substrates, there is also a sealing rubber ring 4 in a square ring shape sealingly connected as shown in FIGS. 11 and 12. The sealing rubber ring 4 may be an integrated structure. The above inner cavity 21 may be formed between the two substrates and the sealing rubber ring 4, that is, each single cell 2 can have a sealing rubber ring 4 on it. As shown in FIGS. 8 and 9, the single cells 2 arranged on the outermost side are shown. The substrate on the side of the negative plate 24 may be the electrode substrate 26, and the substrate on the side of the positive plate 22 is bipolar substrate 25. The other side of the bipolar substrate 25 may be a negative plate 24. The positive plate 22, the bipolar substrate 25 and the negative plate 24 can form a bipolar electrode plate. The other single cells 2 arranged in the middle are bipolar substrates 25 on both sides of the positive plate 22 and the negative plate 24, as shown in FIGS. 7 and 10.

Figure 6:
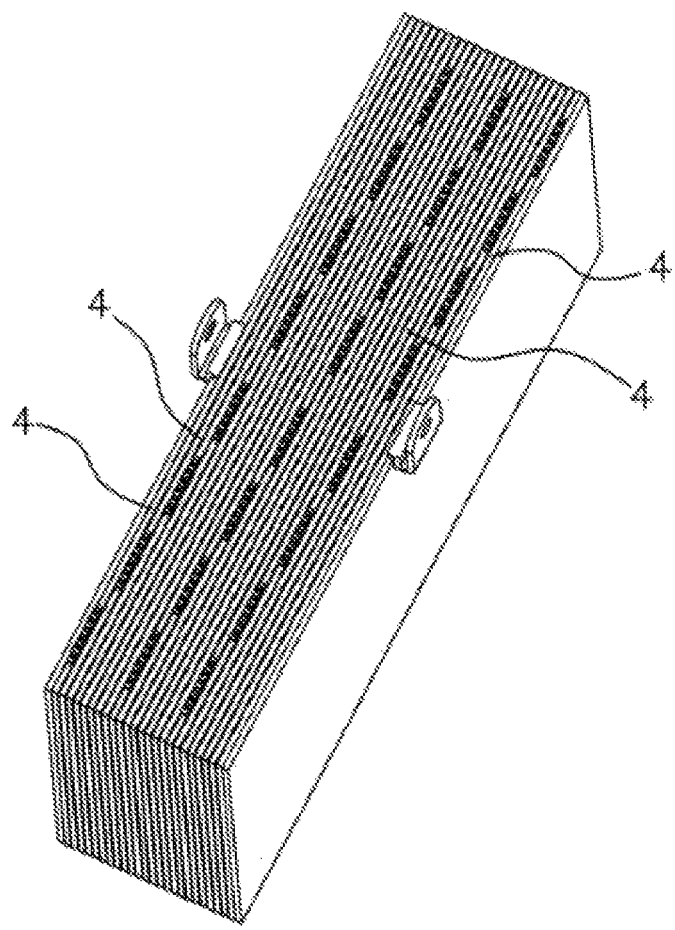
FIG. 6 is one embodiment of a schematic diagram of a structure in which a plurality of single cells in this bipolar lead-acid battery are sequentially stacked of the present disclosure.

As shown in FIGS. 3, 5 and 6, the bottom plate 12b of the air chamber cover 12 may be provided with a plurality of plug holes 12d located on the top of each single cell 2, and the plug holes 12d can make the battery cavity 11a communicate with the air chambers 12a one-by-one. The top of the sealing rubber ring 4 may have a plug portion 41 protruding upward. The plug portion 41 may be correspondingly inserted into the plug hole 12d and sealingly connected with the bottom plate 12b. The plug portion 41 may be throughout provided with a through hole 41a that can communicate the inner cavity 21 of the single cell 2 with the air-distributing chamber 12a.

In the bipolar lead-acid battery, the inner cavity 21 of each single cell 2 can be sequentially connected to the same common pressure chamber 14a through the through hole 41a, the air-distributing chamber 12a, and the vent 13a on the sealing rubber ring 4. That is, the inner cavities 21 of the plurality of single cells 2 may communicate with one another to avoid the situation that the internal structure of the battery is destroyed due to the inconsistency of the internal pressure of each single cell 2. At the same time, the inner cavities 21 of the individual single cells 2 in the bipolar lead-acid battery may be independent of each other. During the formation, filling the inner cavities 21 of the individual cells 2 with electrolyte can also keep the relative separation between the electrolytes in the individual single cells 2, even in the charging process, due to the expansion and contraction of the electrode plate and the electrolyte upward phenomenon, the electrolyte in each single cell 2 can be still separated in each air-distributing chamber 12a without a short circuit.

Embodiment 2

Figure 14:
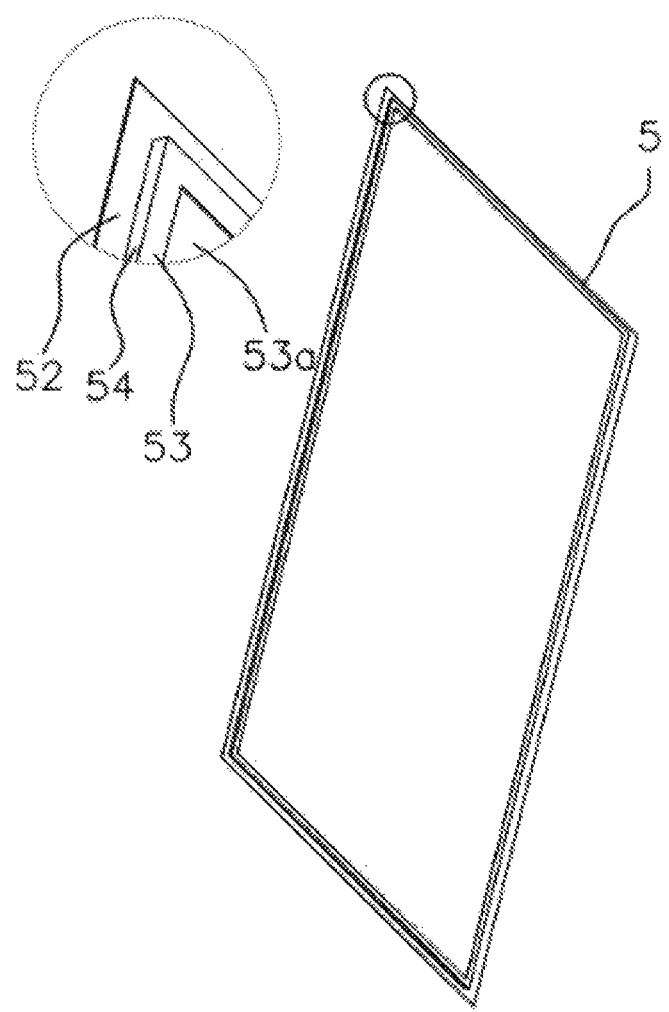
FIG. 14 is a schematic view of the three-dimensional structure of FIG. 13 in the bipolar lead-acid battery of the present disclosure.

The technical solution of this embodiment is substantially the same as that of Embodiment 1, except for the following:

The sealing rubber ring 4 can adopt a split structure, and be connected as a whole by means of gluing or the like. As shown in FIG. 14, the diaphragm 5 may provided with a plurality of horizontally arranged ribs 51 at the middle to increase the strength of the diaphragm 5 itself, such that it is not easy to be deformed, ensuring its isolation effect between the two bipolar substrates 25.

Embodiment 3

Figure 15:
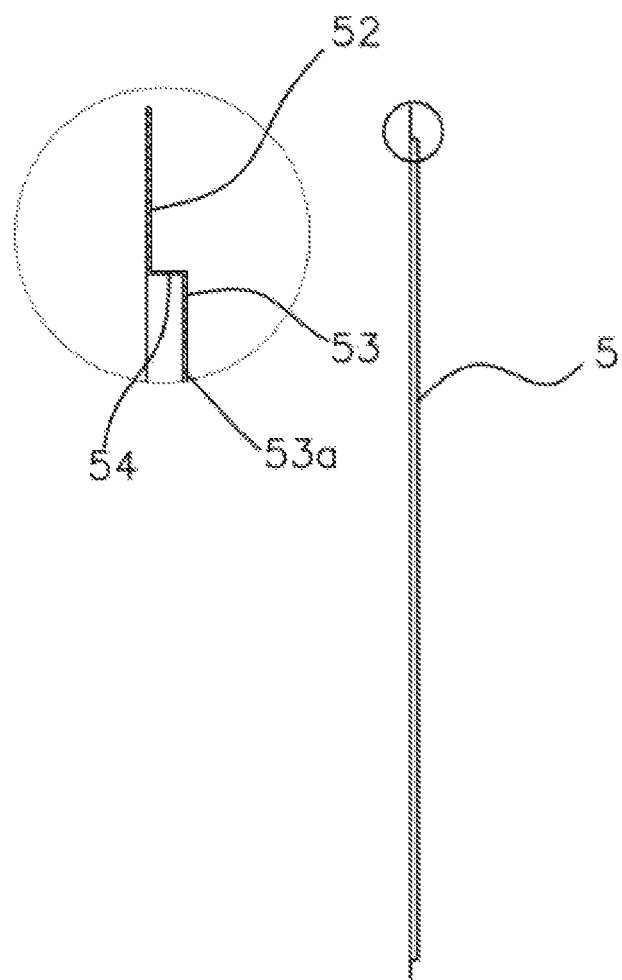
FIG. 15 is a schematic diagram of the A-A sectional structure of FIG. 13 in the bipolar lead-acid battery of the present disclosure.
Figure 16:
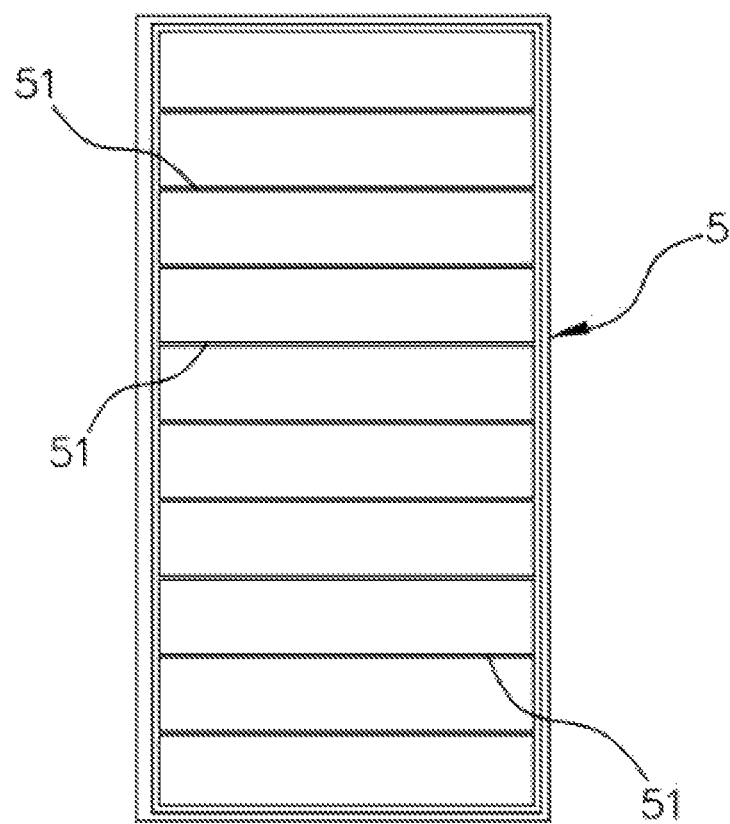
FIG. 16 is a schematic diagram of the structure of the diaphragm of Embodiment 2 of the bipolar lead-acid battery of the present disclosure.
Figure 17:
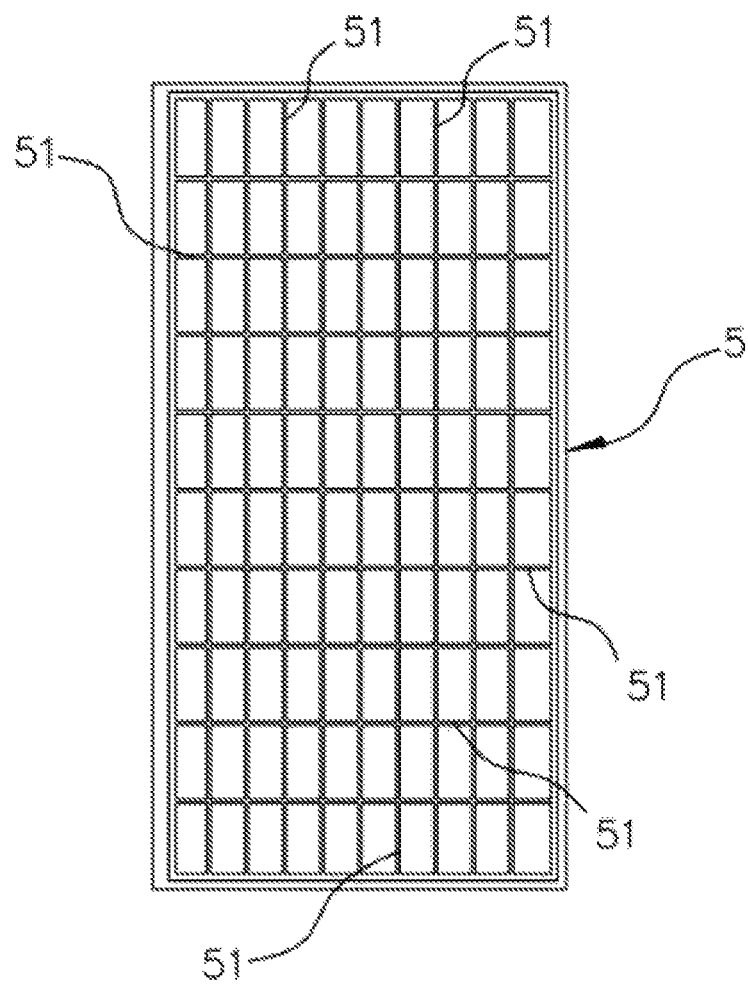
FIG. 17 is a schematic structural diagram of the diaphragm of Embodiment 3 of the bipolar lead-acid battery of the present disclosure.
Figure 18:
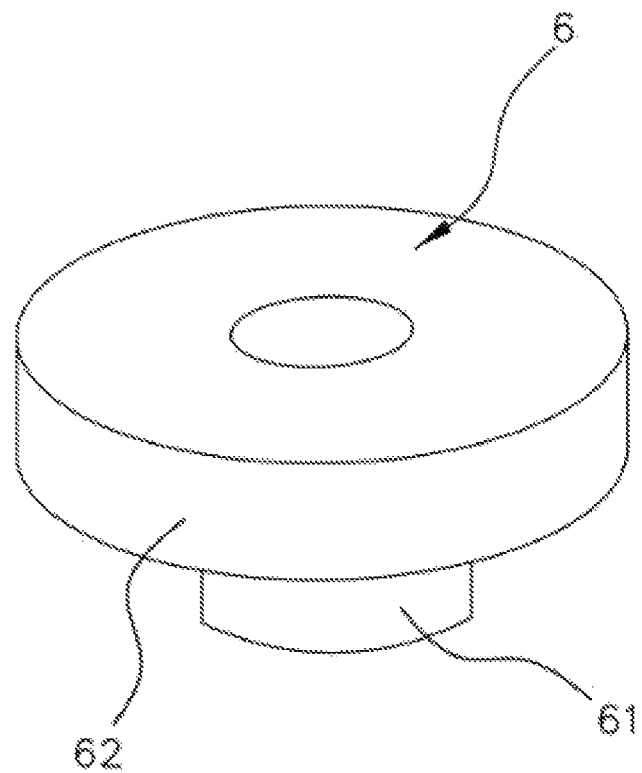
FIG. 18 is one embodiment of a schematic structural view of the air hole umbrella cap of the bipolar lead-acid battery of the present disclosure.

The technical solution of this embodiment is substantially the same as that of Embodiment 1, except for:

As shown in FIG. 15, the diaphragm 5 may be provided with a plurality of ribs 51 arranged alternately in the horizontal direction and the vertical direction, which are used to increase the strength of the diaphragm 5 and make it difficult to deform, so as to ensure its isolation effect between the electrode substrate 26 and the bipolar substrate 25, and between the two bipolar substrates 25.

Embodiment 4

Figure 19:
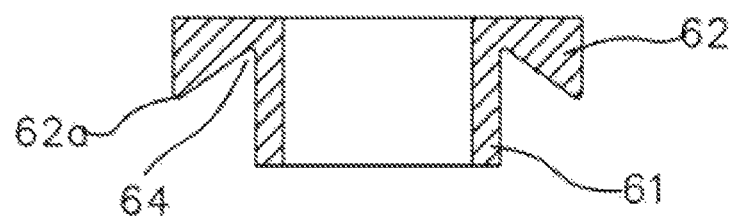
FIG. 19 is a schematic cross-sectional structure view of the air hole umbrella cap of Embodiment 4 of the bipolar lead-acid battery of the present disclosure.

The technical solution of this embodiment is substantially the same as that of Embodiment 1, except for:

As shown in FIG. 19, the air hole umbrella cap 6 may include a connecting portion 61 with a cylindrical shape, and an upper end of the connecting portion 61 may be folded outward to form an annular umbrella portion 62, and a concave annular groove 63 may be formed between the umbrella portion 62 and the connecting portion 61. In this embodiment, the annular groove 63 can be a V-shaped groove 64. After the air hole umbrella cap 6 is installed in the exhaust portion 13b, the umbrella edge 62a may be lower than the bottom of the V-shaped groove 64. The arrangement can avoid the evaporation of the electrolyte and the small water droplets entering into the V-shaped groove 64 under the cold environment, such that the small water droplets on the outer surface of the air hole umbrella cap and at the bottom of the common pressure chamber 14a are separated by the V-shaped groove 64, so the electrical shielding between two adjacent vents 13a can be well achieved through the annular umbrella portion, thereby to avoid the self-discharge phenomenon of the battery, and does not affect the normal exhaust at the vents 13a.

Embodiment 5

Figure 20:
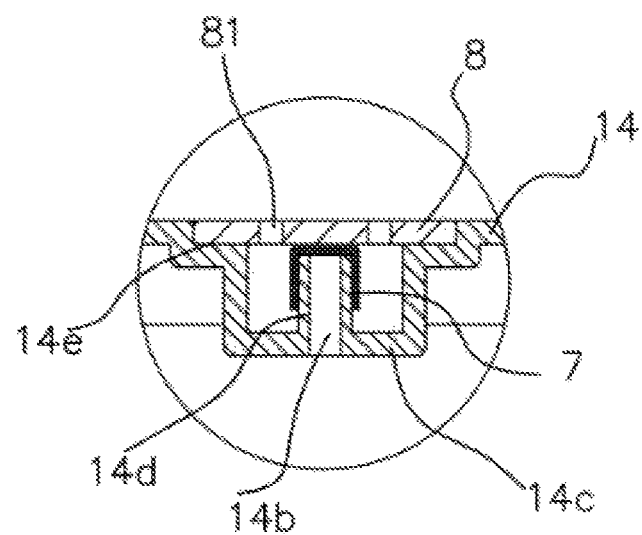
FIG. 20 is a schematic cross-sectional structure view of a safety valve in Embodiment 5 of the bipolar lead-acid battery of the present disclosure.

The technical solution of this embodiment is substantially the same as that of Embodiment 1, except for:

As shown in FIGS. 3 and 20, the safety valve in this embodiment may include a cylindrical fixed seat 14c provided on the common pressure chamber cover 14, a connecting post 14d provided in the fixed seat 14c, and a bonnet 7 connected to the connecting post 14d and an air valve cover 8 fixedly connected with the common pressure chamber cover 14. The fixed seat 14c may protrude from the lower surface of the common pressure chamber cover 14, and the fixed seat 14c may have a positioning surface 14e lower than the upper surface of the common pressure chamber cover 14. The connecting post 14d may be provided in the fixed seat 14c and protrude from the inner bottom surface of the fixed seat 14c. The exhaust port 14b may penetrate the connecting post 14d in the axial direction; the height of the connecting post 14d may be lower than that of the fixed seat 14c. The exhaust port 14b can communicate with the inner cavity of the fixed seat 14c. The connecting post 14d, the fixed seat 14c and the common pressure chamber cover 14 may be an integrated structure in this embodiment. The bonnet 7 may be made of elastic rubber material. The bonnet 7 may have a single-end opening with cylindrical shape. The bonnet 7 may be sleeved on the upper end of the connecting post 14d and tightly fit with the connecting post 14d. The air valve cover 8 may be in the shape of a plate. The air valve cover 8 may be provided with two air outlets 81, the air valve cover 8 may be fixedly connected in the common pressure chamber cover 14, and the lower surface of the air valve cover 8 may abut against the positioning surface 14e of the fixed seat 14c. The top surface of the air valve cover 8 may be flush with or lower than the upper surface of the common pressure chamber cover 14. One end of the two air outlets 81 on the air valve cover 8 may communicate with the inner cavity of the fixed seat 14c, and the other end may be connected to the ambient. When the pressure in the common pressure chamber 14a is too large, the air in the common pressure chamber 14a presses the bonnet 7 through the exhaust port 14b. The bonnet 7 may expand to form a gap with the connecting post 14d, and the air enters the fixed seat 14c through the gap into the inner cavity of fixed seat 14c, then discharged through the air outlet 81 on the air valve cover 8, such that the pressure in the common pressure chamber 14a is in a safe state.

The specific embodiments described herein are merely illustrative of the spirit of the present disclosure. A person skilled in the art to which the present disclosure pertains can make various modifications or additions to the described specific embodiments or substitute in a similar manner, but it will not deviate from the spirit of the present disclosure or go beyond the definition of the appended claims scope.

The invention claimed is:

1. A bipolar lead-acid battery comprising a housing with a battery cavity inside and a plurality of single cells provided in the battery cavity, each of the single cells having an inner cavity for electrolyte injection, and the inner cavity of the each of the single cells being independent of one another, and the housing having a plurality of air-distributing chambers communicating with the inner cavity of the each of the single cells in one-to-one correspondence above the battery cavity, the housing further has a common pressure chamber, all the air-distributing chambers communicate with the common pressure chamber through vents, respectively, wherein the common pressure chamber is located above the air-distributing chambers, and the vents are respectively connected to a bottom of the common pressure chamber.

2. The bipolar lead-acid battery according to claim 1, wherein the vents of the air-distributing chambers are connected with air hole umbrella caps made of insulating materials.

3. The bipolar lead-acid battery according to claim 2, wherein each of the air hole umbrella caps comprises a connecting portion with a cylindrical shape, and an upper end of the connecting portion is folded outward to form a ring-shaped umbrella portion, the housing is located at an upper end of the vents and has a cylindrical exhaust portion protruding upward, and the connecting portion is inserted or sleeved on the exhaust portion.

4. The bipolar lead-acid battery according to claim 1, wherein the each of the single cells comprises a ring-shaped sealing rubber ring and a positive plate, a separator and a negative plate arranged in sequence, the positive plate and the negative plate respectively are provided with substrates at one side opposite to the separator, and the sealing rubber ring is connected between outer edges of two substrates, sealing is formed among the two substrates and the sealing rubber ring; the inner cavity of the each of the single cells is located in the sealing rubber ring, and the sealing rubber ring is also provided with a plurality of through holes used for communicating the inner cavity with the air-distributing chambers.

5. The bipolar lead-acid battery according to claim 4, wherein the single cell further comprises a diaphragm made of an insulating material, the diaphragm is disposed between the two substrates.

6. The bipolar lead-acid battery according to claim 5, wherein the diaphragm is of square ring shape, the substrates and the separator are of square shape, and the diaphragm has an outside length not less than the length of the substrates, the diaphragm has an outside width not less than the width of the substrates, the diaphragm has an inside length less than the length of the separator, the diaphragm has an inside width less than the width of the separator.

7. The bipolar lead-acid battery according to claim 6, wherein the diaphragm has a plurality of ribs in the middle.

8. The bipolar lead-acid battery according to claim 1, wherein the housing comprises a battery case, an air chamber cover, an air chamber middle cover and a common pressure chamber cover that are connected from bottom to top; the battery chamber is located in the battery case, the plurality of the air-distributing chambers are formed between the air chamber cover and the air chamber middle cover; the common pressure chamber is formed between the air chamber middle cover and the common pressure chamber cover.

9. The bipolar lead-acid battery according to claim 8, wherein the air chamber cover comprises a bottom plate and a plurality of partition plates vertically fixed on an upper side of the bottom plate; the partition plates are arranged alternately and the air-distributing chamber is partitioned between the partition plates, and a lower side of the air chamber middle cover abuts against an upper end of the plurality of the partition plates and a seal is formed, the vents are provided on the air chamber middle cover.

10. The bipolar lead-acid battery according to claim 1, wherein the common pressure chamber has exhaust port provided with a safety valve and the safety valve comprises a cylindrical fixed seat provided on the common pressure chamber cover, a connecting post provided in the fixed seat, and a bonnet connected to the connecting post and, an air valve cover fixedly connected with the common pressure chamber cover.

11. The bipolar lead-acid battery according to claim 1, wherein the vents of the air-distributing chambers are connected with air hole umbrella caps made of insulating materials.

12. The bipolar lead-acid battery according to claim 11, wherein each of the air hole umbrella caps comprises a connecting portion with a cylindrical shape, and an upper end of the connecting portion is folded outward to form a ring-shaped umbrella portion, the housing is located at an upper end of the vents and has a cylindrical exhaust portion protruding upward, and the connecting portion is inserted or sleeved on the exhaust portion.

13. The bipolar lead-acid battery according to claim 1, wherein the each of the single cells comprises a ring-shaped sealing rubber ring and a positive plate, a separator and a negative plate arranged in sequence, the positive plate and the negative plate respectively are provided with substrates at one side opposite to the separator, and the sealing rubber ring is connected between outer edges of two substrates, sealing is formed among the two substrates and the sealing rubber ring; the inner cavity of the each of the single cells is located in the sealing rubber ring, and the sealing rubber ring is also provided with a plurality of through holes used for communicating the inner cavity with the air-distributing chambers.

14. The bipolar lead-acid battery according to claim 13, wherein the single cell further comprises a diaphragm made of an insulating material, the diaphragm is disposed between the two substrates.

15. The bipolar lead-acid battery according to claim 14, wherein the diaphragm is of square ring shape, the substrates and the separator are of square shape, and the diaphragm has an outside length not less than the length of the substrates, the diaphragm has an outside width not less than the width of the substrates, the diaphragm has an inside length less than the length of the separator, the diaphragm has an inside width less than the width of the separator.

16. The bipolar lead-acid battery according to claim 15, wherein the diaphragm has a plurality of ribs in the middle.

17. The bipolar lead-acid battery according to claim 1, wherein the housing comprises a battery case, an air chamber cover, an air chamber middle cover and a common pressure chamber cover that are connected from bottom to top; the battery chamber is located in the battery case, the plurality of the air-distributing chambers are formed between the air chamber cover and the air chamber middle cover; the common pressure chamber is formed between the air chamber middle cover and the common pressure chamber cover.

18. The bipolar lead-acid battery according to claim 17, wherein the air chamber cover comprises a bottom plate and a plurality of partition plates vertically fixed on an upper side of the bottom plate; the partition plates are arranged alternately and the air-distributing chamber is partitioned between the partition plates, and a lower side of the air chamber middle cover abuts against an upper end of the plurality of the partition plates and a seal is formed, the vents are provided on the air chamber middle cover.

19. The bipolar lead-acid battery according to claim 1, wherein the common pressure chamber has exhaust port provided with a safety valve and the safety valve comprises a cylindrical fixed seat provided on the common pressure chamber cover, a connecting post provided in the fixed seat, and a bonnet connected to the connecting post and, an air valve cover fixedly connected with the common pressure chamber cover.

* * * * *